(12) United States Patent
Zhou et al.

(10) Patent No.: US 7,844,632 B2
(45) Date of Patent: Nov. 30, 2010

(54) SCALABLE DOM IMPLEMENTATION (75) Inventors: Kongyi Zhou, Fremont, CA (US); K. Karun, Sammamish, WA (US); Jinyu Wang, Austin, TX (US); Tim Yu, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 276 days.

(21) Appl. No.: 11/777,484

(22) Filed: Jul. 13, 2007

(65) Prior Publication Data

US 2008/0098186 A1   Apr. 24, 2008

Related U.S. Application Data

(60) Provisional application No. 60/853,004, filed on Oct. 18, 2006.

(51) Int. Cl.
*G06F 7/00* (2006.01)
(52) U.S. Cl. .................... 707/796; 707/803
(58) Field of Classification Search .................. None
See application file for complete search history.

(56) References Cited

U.S. PATENT DOCUMENTS

| | | | | |
|---|---|---|---|---|
| 6,061,697 A | * | 5/2000 | Nakao | 715/229 |
| 6,684,226 B1 | * | 1/2004 | Bodilsen | 707/203 |
| 2002/0107880 A1 | * | 8/2002 | Bacon | 707/206 |
| 2002/0188613 A1 | * | 12/2002 | Chakraborty et al. | 707/100 |
| 2005/0278289 A1 | | 12/2005 | Gauweiler et al. | |
| 2007/0239749 A1 | | 10/2007 | Farahbod | |
| 2008/0040385 A1 | * | 2/2008 | Barrall et al. | 707/103 Y |
| 2008/0065978 A1 | | 3/2008 | Francker et al. | |
| 2008/0098412 A1 | | 4/2008 | Zhou et al. | |

OTHER PUBLICATIONS

"10 PL/SQL API for XML Type" downloaded Jul. 16, 2007 from the Internet <http://www.stanford.edu./dept/itss/docs/oracle/10g/appdev.101/b10790/xdb10pls.htm>, pp. 1-3 only.

* cited by examiner

*Primary Examiner*—Tim T. Vo
*Assistant Examiner*—Anh Tai V Tran
(74) *Attorney, Agent, or Firm*—Hickman Palermo Truong & Becker LLP; Marcel K. Bingham; Daniel D. Ledesma (57) ABSTRACT

Techniques for implementing a scalable DOM and a pluggable DOM are provided. A scalable DOM implementation manages a DOM tree in memory to free unreferenced nodes, avoid generating nodes unnecessarily, and avoid storing multiple versions of the same data on disk. A pluggable DOM implementation includes an abstract interface that is defined between the API layer and the data layer of a DOM implementation. An implementation of the abstract interface is defined for each data source that is plugged in to the pluggable DOM implementation and that stores XML data in a different format.

22 Claims, 9 Drawing Sheets

SCALABLE DOM IMPLEMENTATION

PRIORITY CLAIM

This application claims priority to U.S. Provisional Application 60/853,004, filed Oct. 18, 2006, entitled SCALABLE DOM IMPLEMENTATION AND OPTIMIZATION, the contents of which are incorporated by reference as if fully set forth herein.

This application is related to U.S. application Ser. No. 11/777,499, filed Jul. 13, 2007, entitled PLUGGABLE DOM IMPLEMENTATION, the contents of which are incorporated by reference as if fully set forth herein:

FIELD OF THE INVENTION

This application is related to database systems, and in particular, to techniques for managing a Document Object Model (DOM) in memory.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

XML

The number of businesses exchanging information electronically is proliferating. Businesses that exchange information have recognized the need for a common standard for representing data. Extensible Markup Language ("XML") is rapidly becoming that common standard.

XML describes and provides structure to a body of data, such as a file or data packet. The XML standard provides for tags that delimit sections of XML data referred to as XML elements. HTML is a form of XML.

An element may contain various types of data, including attributes and other elements. An element that is contained by another element is referred to as a descendant of that other element. By defining an element that contains attributes and descendant elements, the XML entity defines a hierarchical relationship between the element, its descendant elements, and its attributes. A set of elements that have such a hierarchical relationship is referred to herein as an XML tree.

Document Object Model

There are many ways to define structures for representing, or modeling, XML trees. In response to the development of various proprietary models, the World Wide Web Consortium (W3C) promulgated the Document Object Model (DOM) standard. The proprietary models are called intermediate DOMs. An XML tree that conforms to any object model, including the standard DOM, is referred to hereinafter as a "DOM tree."

The standard DOM defines the logical structure of a logical set of XML data (also referred to as "documents") and the way the document is accessed and manipulated. One important objective for the standard DOM is to provide a standard programming interface that can be used in a wide variety of environments and applications. The standard DOM is designed to be used with any programming language.

In order for a computer to operate on an XML tree, an in-memory representation of the XML tree is generated. In general, an XML tree is read from a storage device (e.g., a disk that stores files that contain XML data) to create in-memory data structures used to represent an XML tree. The in-memory data structures are manipulated by applications running on the computer. Typically, the applications access and manipulate the data structures through a set of routines or functions designed for this purpose.

The term "DOM implementation" is used herein to refer to a definition of data structures used to represent a DOM tree, functions or routines that are designed and used to interact with the data structures, or a combination thereof. A DOM implementation may define only data structures. A DOM implementation may be a set of object classes that define attributes and methods.

The term "application software" is used to refer to a set of interrelated software modules that, when executed, provide a particular service or functionality. The term is used to refer to a source code version of the software modules, an executable or runtime version of the software modules, which may be contained in one or more executable programs or files, or versions of the modules stored in a library as object code.

The term "application" is used to refer to one or more processes that, when executed, execute the executable or runtime version of the software modules and maintain program variables.

Typically, a DOM tree is represented as a node tree, which is a set of linked nodes that are hierarchically related. A node in the node tree represents, for example, an element or an attribute. Links between a node and another node represent a hierarchal tree relationship between the nodes and their corresponding elements. For example, a node corresponding to a parent element may be linked to nodes representing child elements of the parent element.

W3C specifications define a common set of DOM APIs. These include the DOM Level 3 Core Specification (W3C recommendation 7 Apr. 2004) (herein Level 3 Core Specification), the DOM Level 2 Core Specification (W3C recommendation 13 Nov. 2000) (herein Level 2 Core Specification), and the DOM Level 1 Specification (W3C recommendation 1 Oct. 1998) (herein Level 1 Specification), the contents of which are incorporated herein by reference.

An XML document is a document that contains one or more XML elements that may or may not conform to an XML schema. When an XML document is read from disk, the amount of memory required to maintain a corresponding DOM tree is typically ten times larger than the XML document.

One approach for reading an XML document and creating a corresponding DOM tree in memory is referred to as lazy materialization. Under this approach, only a part of the DOM tree is materialized (i.e., generated in memory) when the corresponding XML data is needed or accessed. However, simply supporting lazy materialization does not address the scalability issue. For example, as the number of XML documents that are accessed increases, the memory constraints imposed on a computer system to store the corresponding DOM trees increases tenfold.

Consequently, approaches for providing a scalable DOM implementation would be advantageous.

XML Data Stored in Different Formats

XML data may be stored in a variety of different formats. A format is a particular way to encode information for storage in a computer file. Each different type of file has a different format. The format of a file typically specifies whether the file is a binary or ASCII file and how the information is organized. Examples of formats in which XML data is stored include, but are not limited to, node lists and hash tables.

As stated above, a DOM implementation typically combines a set of APIs and underlying XML data. The DOM implementation is dependent on how the XML data is stored. For example, if an XML document is stored in one format and another XML document is stored in another format, then two different sets of API implementations may be required to access the different XML documents and update the different XML documents.

A problem arises when creating a DOM tree from various forms of XML data and the XML data flows from a server to a client or between peer applications. The XML data needs to be converted into regular DOM's internal representation, which not only consumes extra memory but also decreases the performance. Some DOM implementations may have lazy materialization to reduce the memory consumption, but still fail to avoid data conversion and do not work for all types of data accessing.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Scalable DOM Implementation
   2.1 Freeing Memory
      2.1.1 Automatic Node Release
      2.1.2 Manual Node Release
      2.1.3 "Dirty" Nodes
   2.2 Shadow Copy
   2.3 Save With Reference
3.0 Pluggable DOM Implementation
   3.1 Traditional DOM Implementation
   3.2 Pluggable DOM Implementation
      3.2.1 XML Infoset
      3.2.2 InfosetReader
      3.2.3 InfosetWriter
      3.2.4 Example
4.0 Hardware Overview 1.0 General Overview Techniques for implementing a scalable DOM are provided. One approach for implementing a scalable DOM is to free memory that is used by nodes of a DOM tree when those nodes are no longer referenced by any application.

Another approach for implementing a scalable DOM is to avoid materializing objects until those objects are needed. For example, in response to a request to copy a subtree of a DOM tree, a single node is created that represents the subtree instead of copying all the nodes of the subtree. All the nodes of the subtree may be generated when one or more of the "shadow" nodes or one or more nodes of the subtree are modified.

Another approach for implementing a scalable DOM is to save references to unchanged data where possible. For example, in response to creating and storing a second version of XML data, if there are any portions of the XML data that are unchanged from the first version of the XML data, then references to those portions are saved instead of generating a copy of those portions.

Techniques for implementing a pluggable DOM are also provided. There are situations in which XML data from multiple sources are to be read and modified. However, the data in each data source may be formatted differently. Also, a typical DOM implementation consists of a monolithic object tree combining APIs and data. It is therefore difficult to effectively share XML data, of varying formats, among applications. In one approach, a pluggable DOM implementations splits the DOM implementation into two separate layers: an API layer and a data layer. XML data from different data sources are plugged into the pluggable DOM implementation. An abstract interface is defined between the API layer and the data layer of a DOM implementation. An implementation of the abstract interface for each type of data source allows XML data from different data sources to be processed. Thus, the abstract interface is used by a single set of DOM APIs to retrieve and write XML data, regardless of the format in which the XML data is stored.

2.0 Scalable DOM Implementation

The following description provides multiple approaches to implement a scalable DOM, each of which may be implemented separately or together.

2.1 Freeing Memory

A garbage collector is a software tool of a memory management system to reclaim memory that is used by objects that will not be accessed again by an application. There are many types of garbage collectors that use varying strategies for automatically identifying "reclaimable" objects and reclaiming the corresponding memory. For example, a Java Virtual Machine (JVM) includes its own garbage collection routine. A DOM implementation and user programs generally do not have direct control over releasing memory. However, a DOM implementation may help a computer system avoid running out of memory by dereferencing nodes that are not held by applications. The garbage collector will release the node's memory usage when the computer system requires more memory. Typical garbage collectors not work because each child node is linked by a parent node and, thus, the garbage collector detects that each child node is currently referenced, regardless of whether a child node is referenced by any application. A scalable DOM implementation may support manual and/or automatic dereferencing of nodes. As used hereinafter, "dereferencing a node" means that any references to that node are deleted.

There are many situations in which freeing memory may be implemented. For example, in a streaming situation, if a user requests a large XML document to be printed, then after a portion of the XML document is read into memory and sent to the printer, the memory required for that portion may be freed in order to read in another portion of the XML document. In the printing context, the application knows that materialized nodes that have been printed do need to be stored thereafter in memory.

Figure 1A:
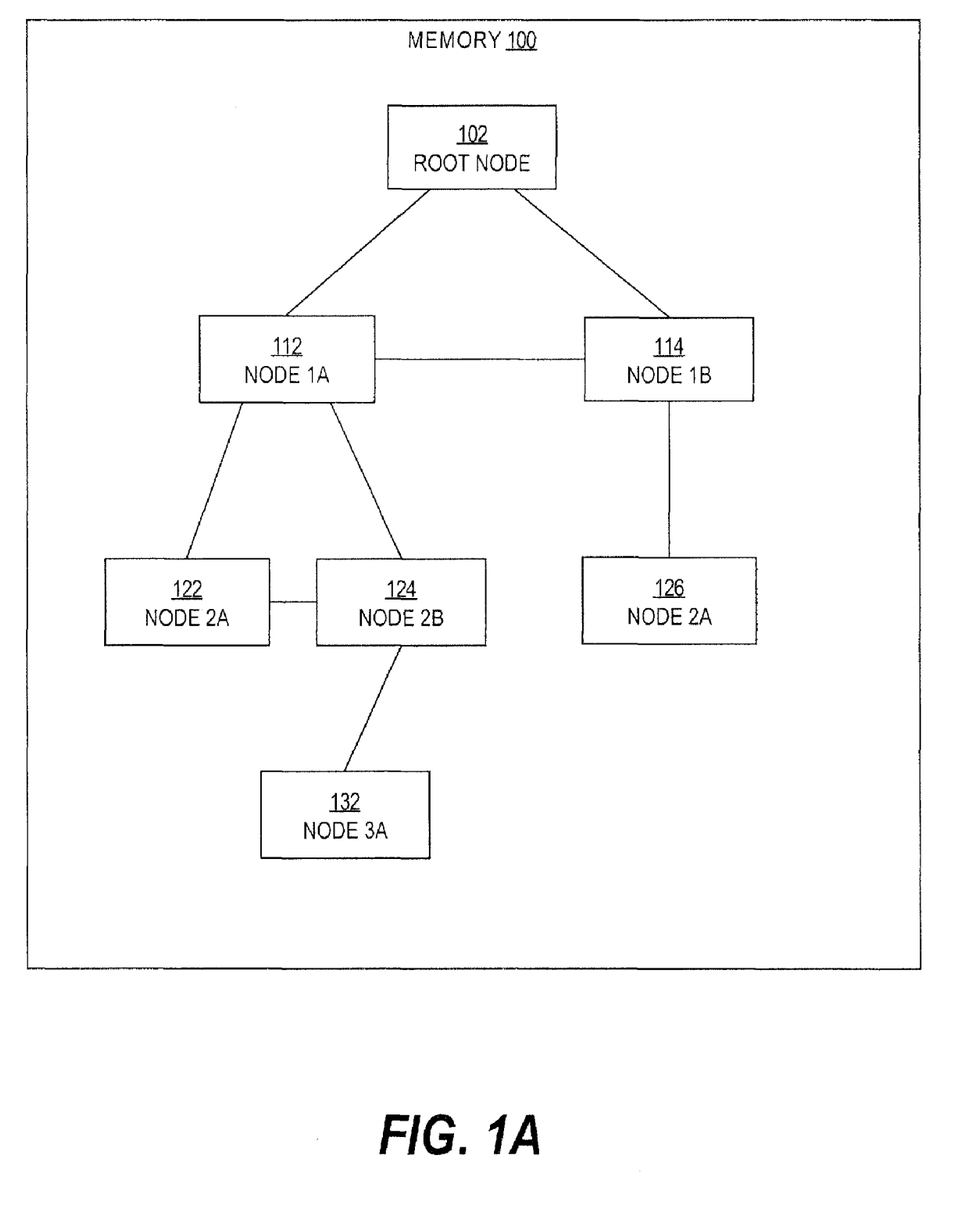
FIGS. 1A-C are block diagrams that illustrate how memory, that is used to store nodes of a DOM tree, may be freed to be used by other nodes in the DOM tree, according to multiple embodiments of the invention.
Figure 1B:
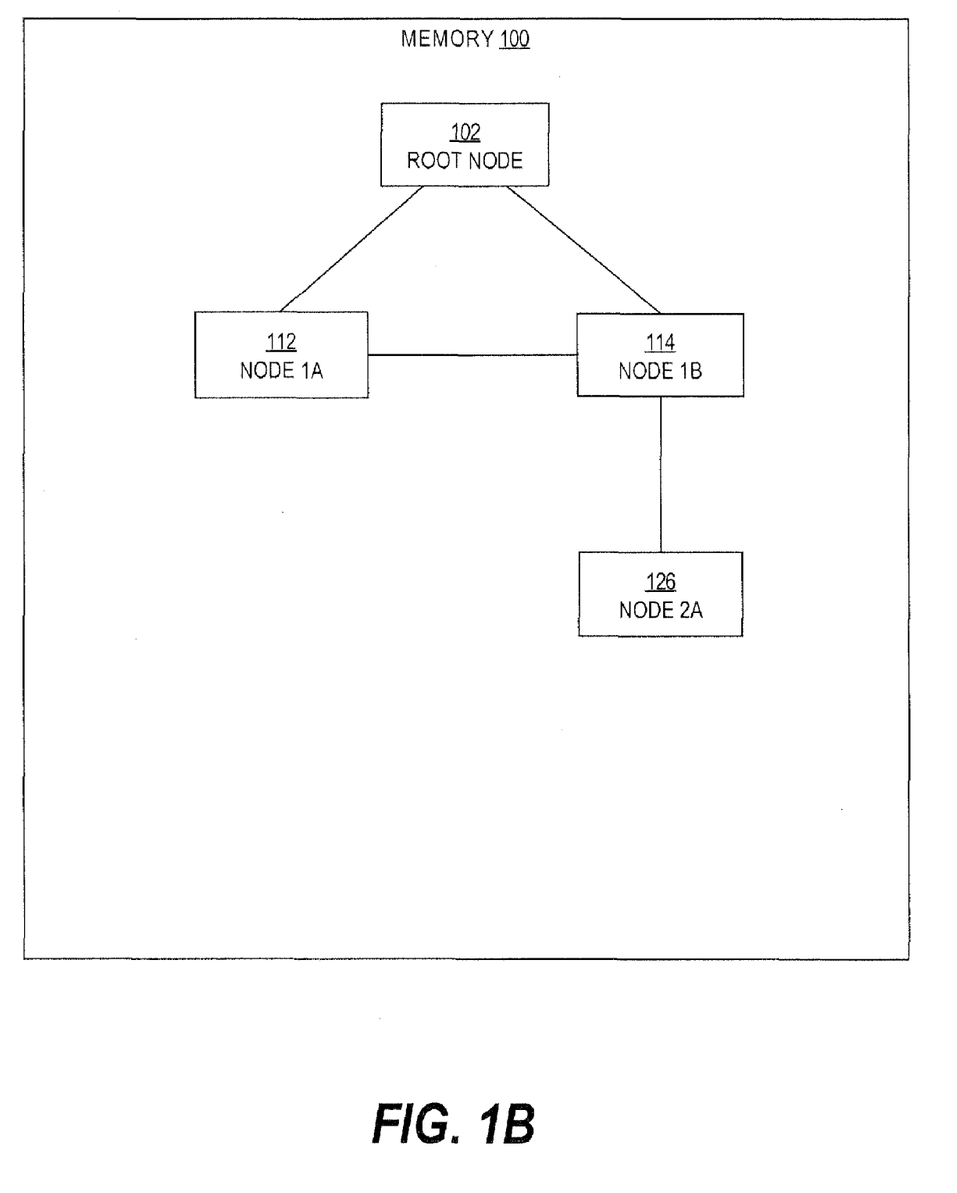
Figure 1C:
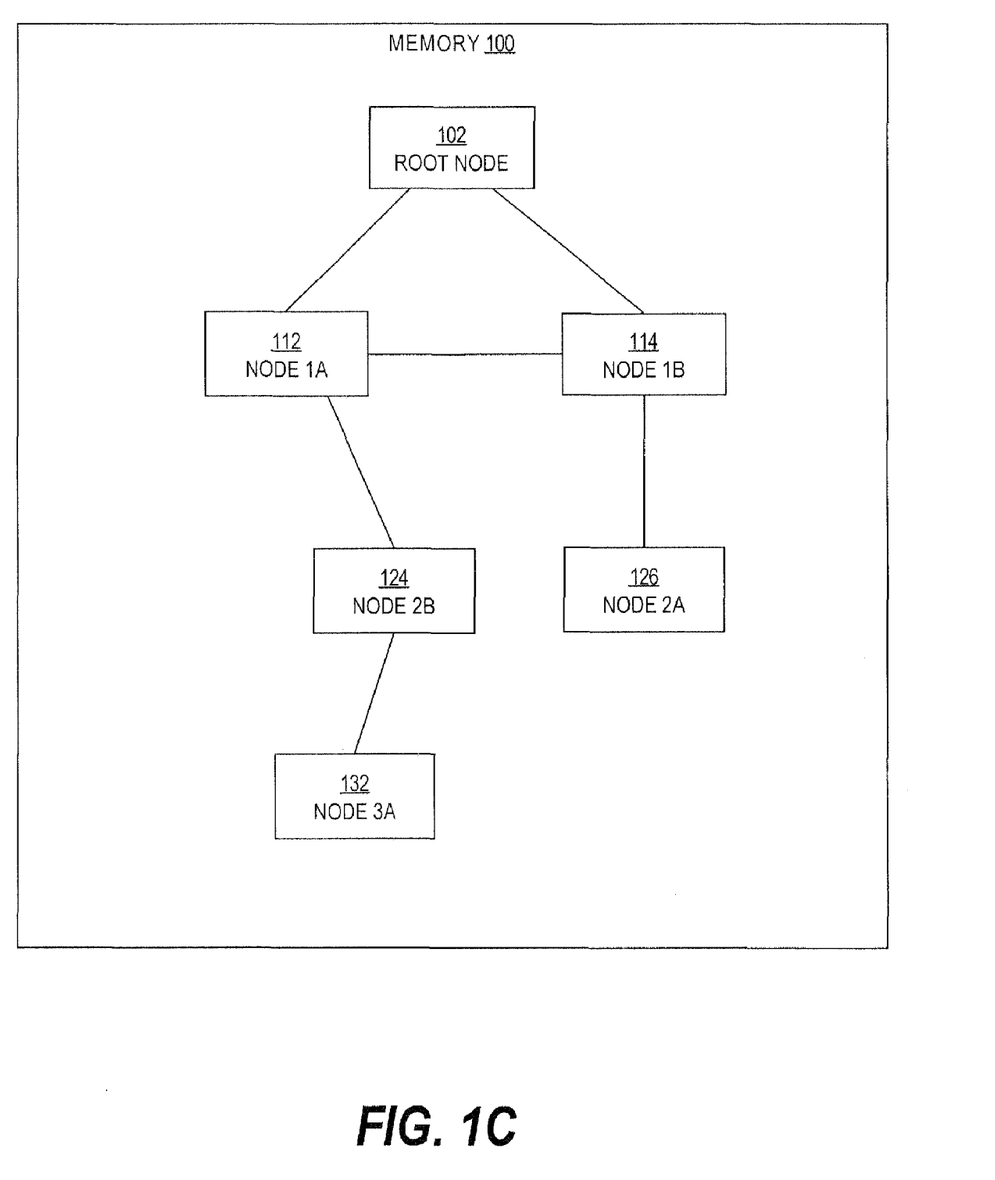

FIGS. 1A-C are block diagrams that illustrate how memory, that is occupied by one or more nodes of a DOM tree, may be freed to be used by other nodes of the DOM tree, according to multiple embodiments of the invention. The portion of a DOM tree that is in memory is referred to hereinafter as the "materialized DOM tree," whereas reference to just "DOM tree" may refer to the entire DOM tree of a document or file, whether or not any portion thereof is in memory (i.e., materialized). Thus, a hierarchical node of a document is materialized if it is represented in memory rather than simply residing on disk (e.g., a database).

FIG. 1A illustrates a materialized portion of a DOM tree in a memory 100. In this example, root node 102 corresponds to the root node of hierarchical data, contained in a document, to which the DOM tree represents. Root node 102 has at least two child nodes—node 1A 112 and node 1B 114.

The numeral in "1A" and "1B" refers to the depth of the node with respect to root node 102. Thus, node 1A 112 and node 1B 114 each have a depth of one. The letter in "1A" and "1B" refers to the order of the children of the parent node. Thus, node 1A 112 is the first child node of root node 102 and node 1B 114 is the second child node of root node 102. Root node 102 may have many more child nodes that are materialized and not shown or are not yet materialized.

As further illustrated in FIG. 1A, node 1A 112 is the parent of node 2A 122 and node 2B 124. Node 2B 124 is the parent of node 3A 132 and node 1B 114 is the parent of node 2A 126. Node 1A 112 is the previous sibling of node 1B 114, which means node 1B 114 is the following sibling of node 1A 112. Similarly, node 2A 122 is the previous sibling of node 2B 124, which means node 2B 124 is the following sibling of node 2A 122.

In order to support DOM navigation operations, cross references (referred to hereinafter as "links") among nodes are used. The lines connecting the illustrated nodes represent links. A semi-vertical line indicates a parent-child relationship, whereas a horizontal line indicates a sibling relationship. Such links may be used to traverse the materialized DOM tree.

2.1.1 Automatic Node Release

According to an embodiment of the invention, in automatic node release (ANR) mode, some of the links between nodes are made "weak", allowing a JVM to free nodes during garbage collection.

The strategy for ANR is based on the importance of the links. Links to a parent node should not be lost for at least two reasons. First, ancestor nodes provide context for in-scope namespaces. Second, it is difficult to materialize a parent node using a streaming API. In comparison, links to child nodes are less important and are easier to recreate. For the same reason, links to the next sibling is easier to recreate than previous sibling links.

Therefore, in an embodiment, a node, in a scalable DOM implementation, "strongly" holds its parent and previous sibling (i.e., using a "strong link") but "weakly" holds its children and following sibling (i.e., using a "weak link"). A node may be "freed" if all the node's descendants and following siblings can also be freed.

To allow memory to be used for processes or nodes other than the current node that is stored in the memory is referred to hereinafter as "freeing the memory" or "freeing the node" that occupies that memory. When nodes are freed by a (e.g., JVM) garbage collector, the links to them from parent nodes still "remember" the positions of the freed nodes in underlying data. Therefore, freed nodes can be recreated when needed.

If FIG. 1A illustrated a materialized DOM tree in the ANR mode, then the link from root node 102 to node 1A 112 would be a weak link, whereas the link from node 1A 112 to root node 102 would be a strong link. Similarly, the link from node 1A 112 to node 1B 114 would be a weak link, whereas the link from node 1B 114 to node 1A 112 would be a strong link.

FIG. 1B is a block diagram that illustrates which nodes may be freed according to an ANR mode, according to an embodiment of an invention. A JVM determines, during a garbage collection process, whether a node can be removed so that the area occupied by the node may be used for other purposes, such as storing other nodes of the DOM tree.

The garbage collection process may begin at the root node, at a leaf node, or at an intermediate node (i.e., neither the root node nor a leaf node). Thus, the garbage collection process may begin examining nodes in a certain area of memory regardless of the relative position of the node in the DOM tree.

As stated above, in the ANR mode, a node can be freed if all the node's descendant nodes and following sibling nodes can also be freed. Therefore, if the garbage collection process examines node 2A 122 to determine whether node 2A 122 can be freed, then not only must no application reference node 2A 122, but all of its descendant nodes (i.e., none in this example) and following sibling nodes (i.e., node 2B 124) must also be "freeable." This determination is a recursive process until (a) a node that is referenced by an application is discovered (which means that the originally examined node cannot be freed) or (b) the last descendant node or last following sibling node is examined. Thus, any node that is connected directly or indirectly through only weak links to an originally examined node must also be freeable.

In this example, node 2B 124 and node 3A 132 are also examined to determine whether they are freeable since they are connected directly or indirectly to node 2A 122 by only weak links. If no application references either of node 2B 124 and node 3A 132, then node 2A 122 may be freed (in addition to node 2B 124 and node 3A 132). FIG. 1B shows what the materialized DOM tree may look like when node 2A 122, node 2B 124, and node 3A 132 are freed.

2.1.2 Manual Node Release

In an embodiment, a manual node release (MNR) mode is enabled instead of an ANR mode. In MNR mode, the DOM tree depends on an application to explicitly dereference a document fragment from the whole DOM tree. Also in MNR mode, weak references are not required in DOM node creation.

If an application has a deterministic order of processing the data (e.g., reading an XML document in document order), then employing MNR is more efficient because MNR avoid nodes being repeatedly released and recreated. Also, the overhead of using weak links is averted.

An application calls a certain function (hereinafter "freeNode") on a node, which will dereference the node from all other nodes. For example:

```
Element root = doc.getDocumentElement( );
Node item = root.getFirstChild( );
While (item != null)
{
    processItem(item);
    Node tmp = item;
    item = item.getNextSibling( );
    tmp.freeNode( );
}
```

The freeNode call may have no effect on normal DOM. It should be noted that dereferencing nodes is different from removing nodes from a DOM tree. Semantically, the DOM tree does not change when freeNode is called on a node. The node may still be accessed from its parent node and previous and following sibling nodes. If the node is accessed from one of those related nodes, then the node may be rematerialized. However, a variable that holds the node may receive an error when accessing the node after the node has been freed.

FIG. 1C is a block diagram that illustrates which nodes may be freed according to an MNR mode, according to an embodiment of an invention. In this example, an application calls freeNode on node 2A 122, which results in deleting all links from any node in the materialized DOM tree to node 2A 122. A garbage collection process examines node 2A 122 to determine whether node 2A 122 can be freed. Because no application references node 2A 122 and all links to node 2A 122 have been deleted, node 2A 122 is freed regardless of the "freeability" of any of the other nodes in the materialized DOM tree. Thus, one or more applications may reference node 2B 124 and/or node 3A 132 when node 2A 122 is freed under MNR mode.

2.1.3 "Dirty" Nodes

In some cases, certain actions have to be performed before nodes, that are candidates for being freed, are in fact freed. For example, freeable nodes may have been modified since being read into memory where the corresponding modifications have not yet been saved to disk. Such modified nodes are referred to as "dirty nodes." Before dirty nodes are freed, the corresponding modifications need to be saved or stored persistently. Therefore, only after the modifications have been saved (or after an instruction has been created that identifies the dirty node and its corresponding modification) are the dirty nodes freed.

2.2 Shadow Copy

Copy operations such as importNode, clone, or adoptNode are expensive operations in terms of processing time and memory usage. According to an embodiment of the invention, a scalable DOM implementation allows for shadow copying. A "shadow copy" is a new node or reference that represents a subtree of a DOM tree as a result of a copy operation to copy the subtree. In response to the copy operation, a shadow copy is created rather than generating an actual copy of each node in the subtree. The subtree may comprise a single node or multiple nodes that each have a common ancestor node (except, of course, for the root node of the subtree). The shadow copy may reference the root node of the subtree.

Figure 2A:
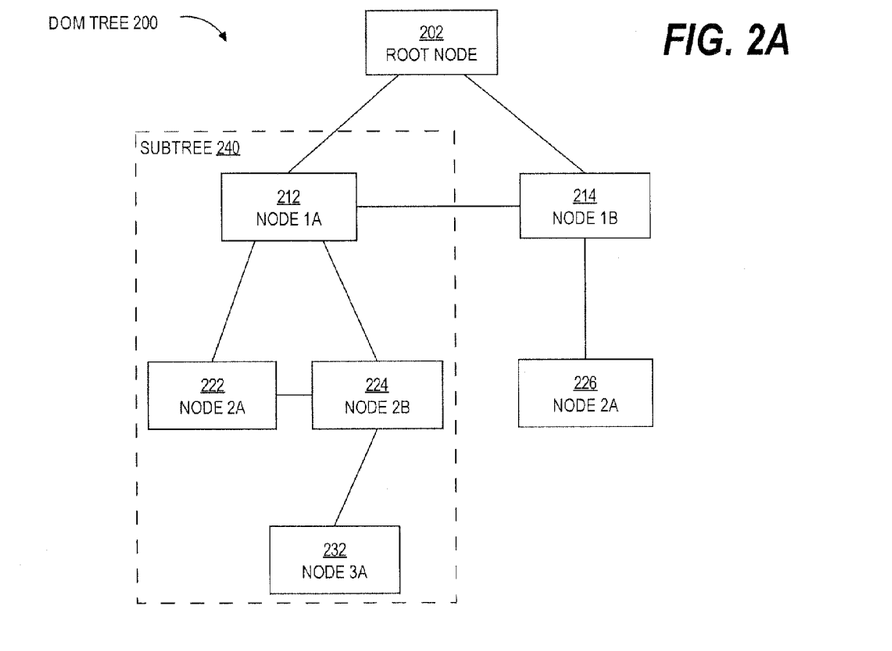
FIGS. 2A-B are block diagrams that illustrate a shadow copy, according to an embodiment of the invention.
Figure 2B:
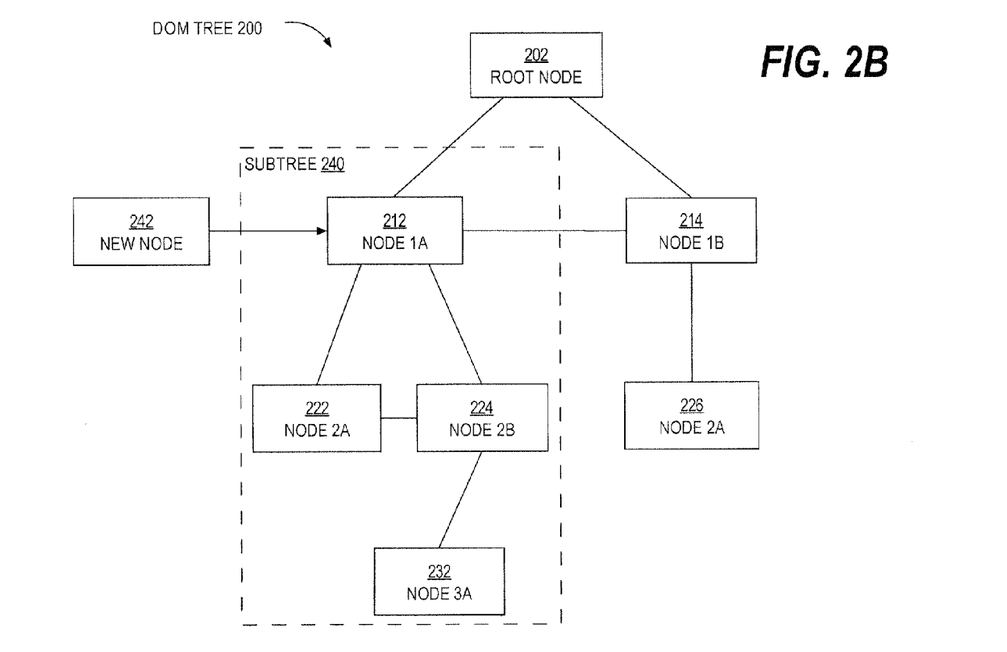

FIGS. 2A-B are block diagrams that illustrate a shadow copy, according to an embodiment of the invention. A DOM tree 200 comprises a root node 202 that is the parent of a node 1A 212 and a node 1B 214. Node 1A 212 is the parent of a node 2A 222 and a node 2B 224. Node 1B 214 is a parent of a node 2A 226. Node 2B 224 is a parent of a node 3A 232.

An instruction is received to generate a copy of subtree 240, which comprises node 1A 212 and all its descendants, as illustrated. FIG. 2B illustrates that, in response to the instruction, instead of generating a copy of subtree 240, a new node 242 is generated. New node 242 is caused to point to, or reference, the root of subtree 240, which is node 2A 212. Thus, all the descendants of node 2A 212 are not copied and the data represented by subtree 240 may be shared. In an embodiment, none of the nodes in subtree 240 are copied as a result the copy operation.

In an embodiment, if an application requests to read a node of the copy of subtree 240, then new node 242 is used to read the node of subtree 240 that corresponds to the requested node of the copy.

In an embodiment, if an instruction is received to save the copy of the subtree, then, instead of generating a copy of each node of the subtree and saving each generated copy, a reference is stored on disk. Such a reference is described in more detail below under the "Save With Reference" heading. Basically, the reference references the portion of the XML data (stored on disk) that is represented by the subtree. Therefore, the available storage capacity of a database is not consumed as quickly when saving references to subtrees rather than saving an exact copy of the same subtrees.

In an embodiment, if an application seeks to modify one or more nodes of a shadow copy, then a copy of just those one or more nodes is generated. For example, in FIG. 2B, if an instruction is received to modify the copy of node 2A 222, then a copy of only node 2A 222 is generated and the modification is made to that copy.

In a related embodiment, if an application seeks to modify one or more nodes of a shadow copy, then a copy of the entire subtree (i.e., all the nodes in the subtree) is generated, even the nodes that are not to be modified. For example, in FIG. 2B, if an instruction is received to modify just the copy of node 2A 222, then a copy of each node in subtree 240 is generated and the modification is made to the copy of node 2A 222.

In an embodiment, if an application seeks to modify one or more nodes of an original subtree, then a copy of the entire subtree is generated. In some cases, however, a user may intend that a shadow copy remain consistent with the original subtree. In those cases, then, the one or more nodes of the original subtree are modified without generating any actual copies and without modifying the shadow copy in any way.

Because a shadow copy references a subtree, a garbage collection routine will not garbage collect (or free) the subtree until the shadow copy is deleted. One way in which a shadow copy may be deleted is when the shadow copy is garbage collected (i.e., when no application references the shadow copy). Another way in which a shadow copy may be deleted is when one or more nodes of the copy or original subtree are modified. If an actual copy of the subtree is generated as a result of the modification, then the shadow copy is no longer required and may be deleted.

2.3 Save With Reference

In some instances, a user seeks to create a second (or subsequent) version of a large file by modifying a small portion of the file, such as adding 1 MB of data to a 100 MB XML document, and saving the change. As a result, a copy of the entire file is created and saved along with the addition. If the user performs similar operations daily or even weekly, then the amount of available disk space will decrease rapidly.

Therefore, according to an embodiment of the invention, instead of saving the unmodified portion of a file in addition to a modification, one or more references are created to reference the unmodified portion of the file.

As indicated above with reference to shadow copy, a scalable DOM implementation may maintain references to the corresponding XML data to minimize the DOM's memory footprint and share the data among different DOMs. However, if data still needs to be copied to the target location when the data represented by the DOM is written to disk, then the purpose of data sharing is defeated, at least with respect to disk space. To address this issue, the scalable DOM takes advantage of a reference to a subtree by saving that reference instead of the actual data that the subtree represents if the user knows that the data source will be available for deserialization.

There are two typical use cases for saving references—saving changes and saving shadow copies. In the saving shadow copy case, when an XML fragment is imported from other documents, one or more references to the XML fragment are created. If an application instructs the imported XML fragment to be saved, then only the one or more references are saved, which avoids unnecessary copying.

Figure 3:
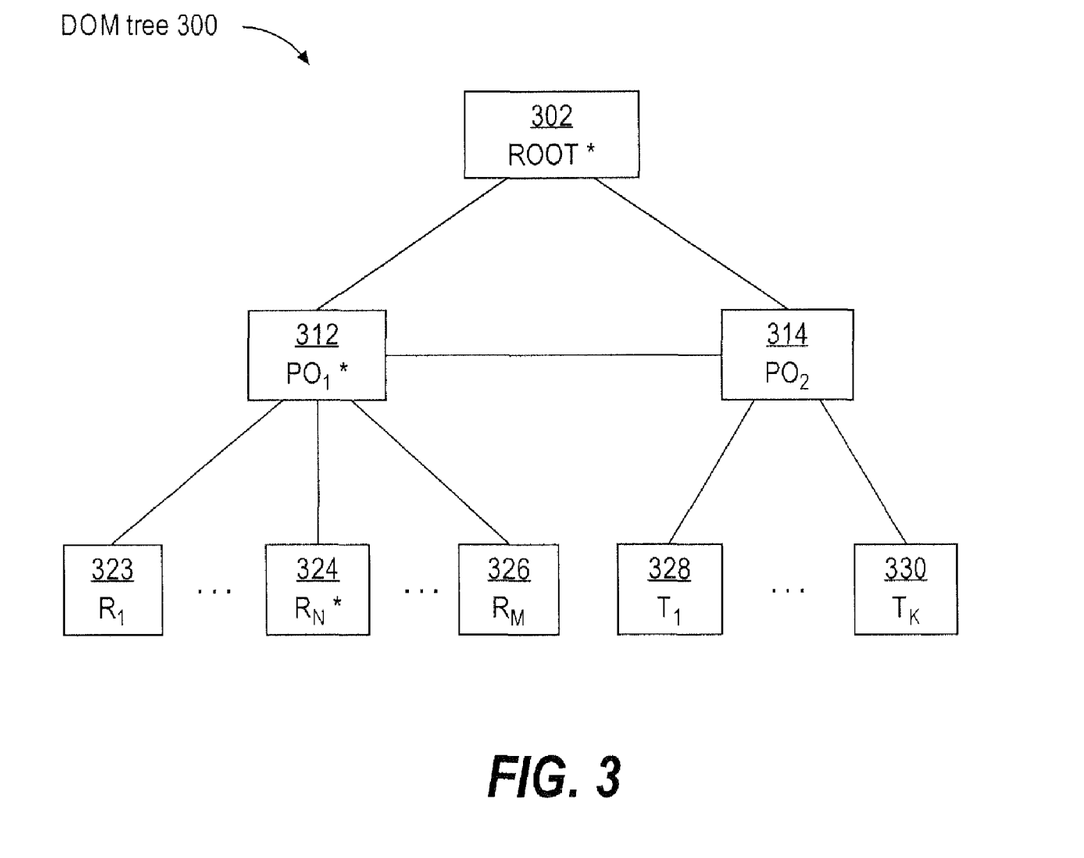
FIG. 3 is a block diagram that illustrates how changes to a DOM tree 300 are saved, according to an embodiment of the invention.

FIG. 3 is a block diagram that illustrates how changes to a DOM tree 300 are saved, according to an embodiment of the invention. A materialized portion of DOM tree 300 comprises a root 302 node, at least two Purchase Order (PO) nodes (312 and 314) that are child nodes of root 302, multiple nodes $R_1$-$R_M$ 322-326 that are child nodes of $PO_1$ 312, and multiple nodes $T_1$-$T_K$ 328-330 that are child nodes of $PO_2$ 314.

Each node that is modified (e.g., updated, deleted, added) is labeled or marked. Hereinafter, a "modified" node is a materialized node that has been modified in memory but which has not yet been saved to disk. Also, each ancestor node of a marked node is also marked as having modified content in the corresponding subtree. The marking of an ancestor node that has not been modified may or may not be different than the marking of an unsaved modified node.

In the illustrated example of FIG. 3, node $R_N$ 324 has been modified. Thus, node $R_N$ 324 is marked (with an asterisk). Furthermore, $PO_1$ 312 node and root 302 are also marked since they are ancestor nodes of node $R_N$ 324.

After an instruction is received to save DOM tree 300, references to unmodified nodes and any subtrees with unmodified nodes are also saved. The references may have been created immediately after the modification to node $R_N$ 324 so that other DOMs may have access to the unmodified nodes of DOM tree 300.

In FIG. 3, when DOM tree 300 is saved to disk, the serialization (i.e., layout on disk) may look like the following:

| Root | $PO_1$ | Ref(S, $R_1$ – $R_{N-1}$) | $R_N$ | Ref(S, $R_{N+1}$ – $R_M$) | /$PO_1$ | Ref(S, $PO_2$) | /Root | where "S" is a data stream (e.g., text stream or binary stream), and where Ref(S, $R_1$-$R_{N-1}$) indicates that the section of data (e.g., binary data) in the data stream S starts from $R_1$'s offset and ends at $R_{N-1}$'s offset. The non-referenced data in this serialization include only the opening and closing tags of Root, the opening and closing tags of $PO_1$, and the modified node $R_N$. The non-referenced data may also include any attributes of the corresponding node.

One drawback from saving references to unmodified data instead of the actual data is that dependencies between the underlying hierarchical data have to be managed. After a second version is created using references to the first version of data, in order to access unmodified data (i.e., data that is referenced), the saved references must be interpreted (i.e., dereferenced).

However, a benefit of saving references is that writing changes to disk may be much faster since large portions of a document may be represented by a single reference. Another benefit is the amount of disk space that is saved. These benefits are quite apparent especially when the changes to a (e.g., XML) document are minor relative to the entire document.

3.0 Pluggable DOM Implementation 3.1 Traditional DOM Implementation

Figure 4A:
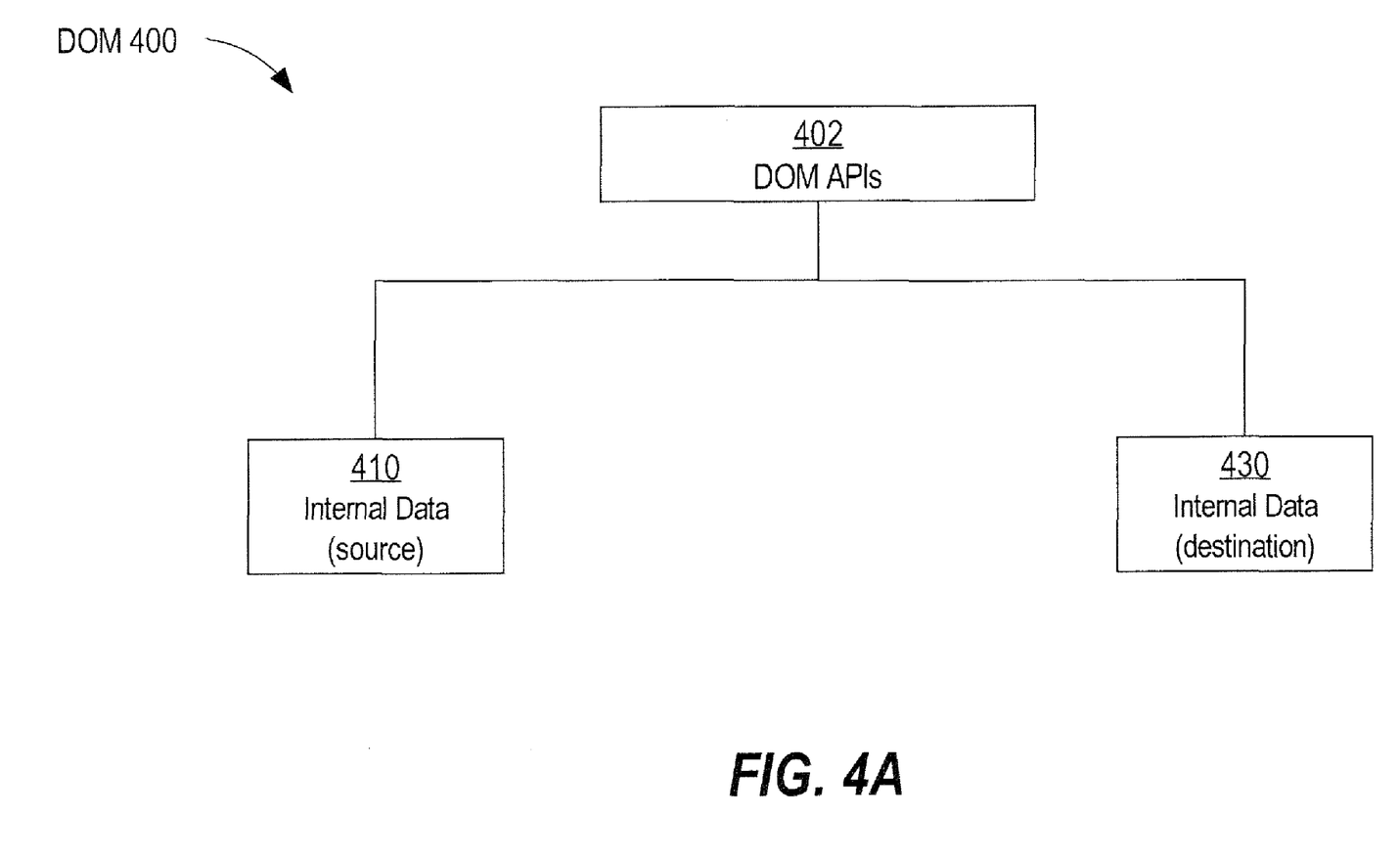
FIGS. 4A-C are block diagrams that illustrate a pluggable DOM implementation, according to an embodiment of the invention.

A traditional DOM implementation is a large object tree ("DOM tree") that comprises a set of APIs and XML data. FIG. 4A is a block diagram that illustrates a high-level view of a typical DOM 400 implementation. DOM 400 implementation comprises DOM APIs 402, internal data 410 for input (i.e., source to read data), and internal data 430 for output (i.e., destination to write data). Internal data 410 and internal data 430 may be the same physical data source. DOM 400 implementation is typically implemented to support only data that is stored in a particular format. For example, formats in which XML data may be stored include, but are not limited to, a node list and a hash table. Currently, there are approximately ten different formats in which XML data may be stored.

3.2 Pluggable DOM Implementation

Figure 4B:
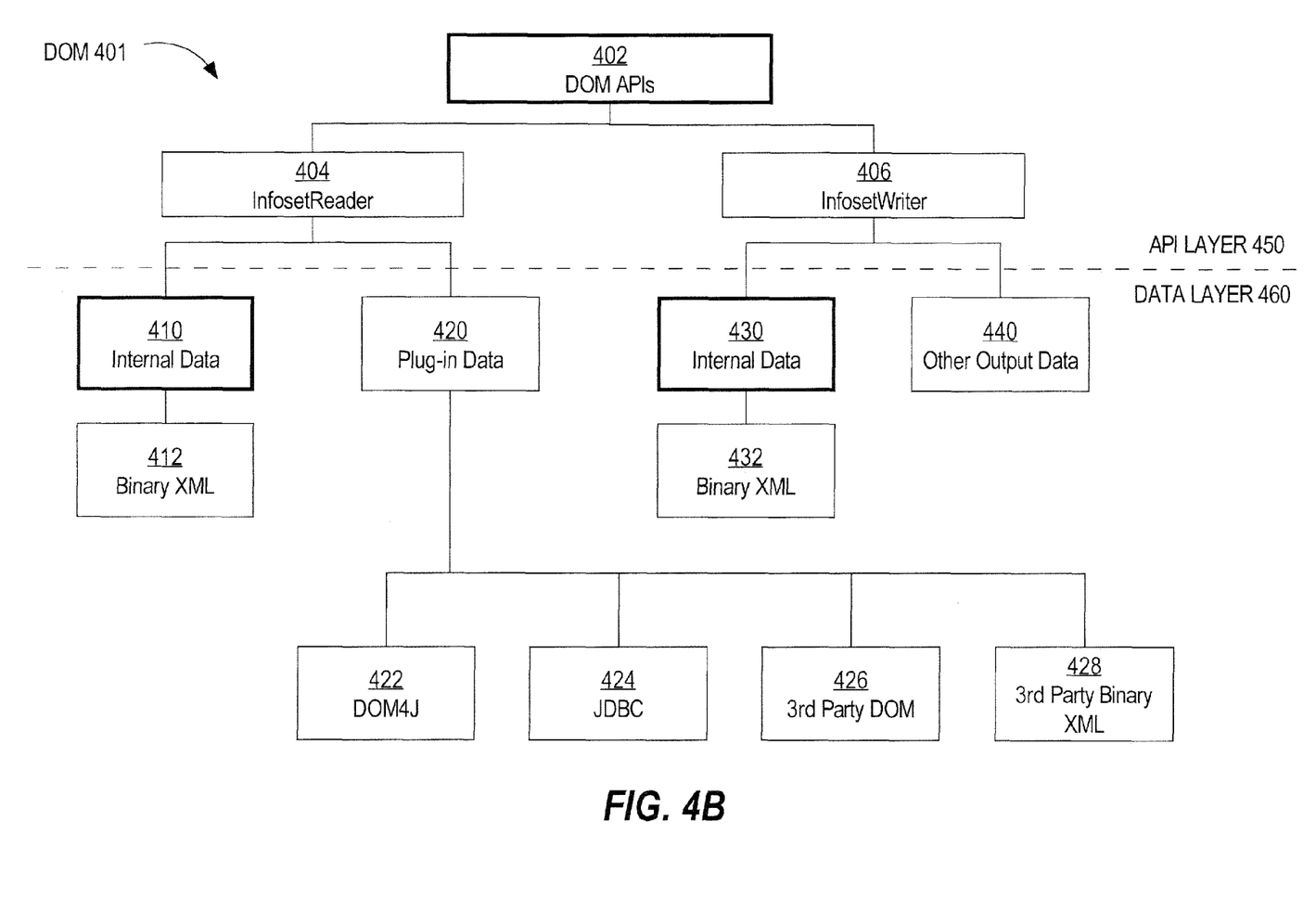

FIG. 4B is a block diagram that illustrates a pluggable DOM 401 implementation, according to an embodiment of the invention. Pluggable DOM 401 implementation comprises at least two separate layers: an API layer 450 and a data layer 460. API layer 450 may comprise lightweight, transient node links to underlying data. Node links may be "lightweight" in that a node is not required to be materialized before the corresponding data is provided to the requestor. A node link may be transient in that the node link may not persist through the life span of a DOM (i.e., the node link may be released and re-created while a portion of the DOM is in memory). If pluggable DOM 401 implementation is also scalable, then the API layer 450 may provide only the links while the corresponding data are not required to be materialized objects.

In order to support XML data that is stored in different formats, abstract interfaces InfosetReader 404 and InfosetWriter 406 are defined between API layer 450 and data layer 460. The APIs of InfosetReader 404 and InfosetWriter 406 are described in more detail below in sections entitled "InfosetReader" and "InfosetWriter," respectively.

Data layer 460 comprises input data and output data, each of which may comprise two varieties: internal data and plug-in data. For example, data may be read from internal data 410 or from a plug-in data 420. Any type of data source may be plugged into pluggable DOM 401 implementation. However, FIG. 4B illustrates that plug-in data 420 comprises four data sources: DOM4J 422, JDBC 424, a third-party DOM 426, and a third-party binary XML 428.

As FIG. 4B illustrates, the format of internal data 410 and the format of the different data sources of plug-in data 420 may be different. Data may be written to internal data 430 (which may or may not be the same data source as internal data 410) or to output data 440 (which may or may not be one or more of the data sources of plug-in data 420). Similarly, the format in which internal data 430 and output data 440 are stored may be different.

As illustrated in FIG. 4B, internal data 410 and 430 are stored, respectively, in a binary XML 412 and 432 format, such as CSX, which is developed by Oracle. Binary XML 412 may be backed by external storage for scalability.

Examples of a third-party DOM 426 include JDOM and Xerces DOM. Examples of third-party binary XML 428 include CXML, Fast Infoset (developed by Sun Microsystems), and MS binary XML (developed by Microsoft).

3.2.1 XML Infoset

Each data source (e.g., DOM4J 422) contains an XML information set (Infoset). XML Infoset is an abstract data model that describes the information available from an XML document. For many applications, this way of looking at an XML document is more useful than having to analyze and interpret XML syntax. DOM describes an API through which the information in an XML Infoset (i.e., the information available from a specific XML document) may be accessed from different programming languages. Because each data source has its own storage model, an implementation of InfosetReader 404 is defined for each data source in order to retrieve the XML Infoset from each data source.

Plug-in data, such as DOM4J 422, will typically already comprise parsed XML entities. Parsed XML entities are XML data that has already been parsed into an object format. If an implementation of InfosetReader 404 is defined for a data source, then the parsed XML entities of that data source may be plugged in directly to create a DOM tree. Therefore, the pluggable DOM 401 implementation is not required to parse the data of each plugged-in data source if the XML data is already parsed.

In an embodiment, if a data source comprises XML text rather than parsed XML entities, then a pluggable DOM implementation does not call the APIs of InfosetReader 404 in order to initially access the XML text. Instead, the pluggable DOM implementation includes an XML parser that parses the XML text and stores the resulting parsed XML entities in an internal data format, such as a binary format. Subsequently, the pluggable DOM 401 implementation calls the APIs of InfosetWriter 406 and InfosetReader 404 to store and retrieve the resulting parsed XML entities.

3.2.2 InfosetReader

API layer 450 may access and update XML data through InfosetReader 404 and InfosetWriter 406 regardless of whether the data is internal or plug-in. Any forms of XML data supporting InfosetReader 404 may be plugged into the DOM 401 implementation. Thus, in order to support access to XML data stored in varying formats, an implementation of InfosetReader 404 is defined for each of the different formats. For example, an implementation of InfosetReader 404 is defined for Fast Infoset, and another implementation is defined for CSX. A particular implementation translates calls to the methods of InfosetReader 404 into proper calls for processing data of the corresponding format.

InfosetReader 404 is a generic, stream-based pull API to access various XML data. The basic operations of InfosetReader 404 are to retrieve sequential events from an XML stream and query the state and data from the events. The following is an example where the XML data is scanned to retrieve the names and attributes of XML elements:

```
InfosetReader reader;
while (reader.hasNext( )) {
    reader.next( );
    if (reader.getEventType( ) == START_ELEMENT) {
        QName name = reader.getQName( );
        TypedAttributeList attrList = reader.getAttributeList( );
    }
}
```

To support lazy materialization, InfosetReader 404 may optionally have the ability to move focus to any location specified by an offset:

If (reader.hasSeekSupport( )) Reader.seek(Offset);

In an embodiment, a new copy of InfosetReader 404 is created to support shadow copy (discussed above), which ensures thread safety.

Table 1 lists a set of example APIs that InfosetReader 404 may support.

TABLE 1

| API | Description |
|---|---|
| boolean isSeekSupported( ) | Returns true if seek function is supported. |
| Offset getOffset( ) | Returns an opaque object representing the current position/offset in the reader. The Offset object can be used to seek to this position using the seek( ) function. Returns Offset or null if seek is not support. |
| void seek(Offset offset) | Seeks to a position in the reader represented by the Offset. This function will throw UnsupportedOperationException if seek is supported. |
| int getEventType( ) | Returns an integer code that indicates the type of the event to which the cursor is pointing. |
| boolean hasNext( ) | Returns true if there are more parsing events and false if there are no more events. This method will return false if the current state of the InfosetReader is END_DOCUMENT. |
| void next( ); | Returns the next parsing event. This method will throw an IllegalStateException if it is called after hasNext( ) returns false. |
| void skip( ); | Skip this parsing event and the complete subtree. This method has different behavior (as compared <code>next( )</code>) only when the current event is START_DOCUMENT or START_ELEMENT. The getEventType will return END_DOCUMENT or END_ELEMENT, skipping the content of the document or element. This method will throw an IllegalStateException if it is called after hasNext( ) returns false. |
| String getEncoding( ) | Returns the xml encoding declared on the xml declaration. Returns null if none was declared. |
| String getVersion( ); | Returns the xml version declared on the xml declaration. Returns null if none was declared. |
| String getStandalone( ); | Returns the xml standalone declared on the xml declaration. Returns null if none was declared. |
| DTD getDoctype( ) | Returns the DTD associated with the XML data. Returns null if no DTD. |
| QName getQName( ); | Returns the name of the current event type. This is valid at START_ELEMENT, END_ELEMENT, PROCESSING_INSTRUCTION, START_ENTITY, ENTITY_REFERENCE, and END_ENTITY events. |
| QName getTypeName( ) | Returns the type name of the element or the Qname of the schema. This is valid at START_ELEMENT. |
| int getPrimitiveTypeId( ) | Returns the primitive type of the element. This is valid at START_ELEMENT. |
| boolean isGlobal( ) | Returns true if the corresponding element declaration is global. This is valid at START_ELEMENT. |
| boolean isNilled( ) | Returns true if the element is nilled; false otherwise. This is valid at START_ELEMENT. |
| TypedAttributes getAttributes( ) | Returns the set of attributes of the current element. Valid only if the current event is START_ELEMENT. |

TABLE 1-continued

| API | Description |
| --- | --- |
| char[ ] getData( ) | Returns the data corresponding to the current event. The starting offset of the data is returned by getDataStart, and the length is returned by getDataLength. |
| int getDataStart( ) | Returns the offset into the text character array where the first character (of this text event) is stored. A java.lang.IllegalStateException is thrown if this state is not a valid data state. |
| int getDataLength( ) | Returns the length of the sequence of characters for this event within the text character array. A java.lang.IllegalStateException is thrown if this state is not a valid data state. |
| void close( ) | Frees any resources associated with this InfosetReader. |

3.2.3 InfosetWriter

InfosetWriter 406 is an extension of InfosetReader 404 that supports data writing. In an embodiment, an implementation of InfosetWriter 406 is created for each implementation of InfosetReader 404. In an alternative embodiment, a single implementation of InfosetWriter 406 is used to write data in a particular format (e.g., CSX). In this way, all data sources (including plug-in data 420) may eventually be stored in the same format.

3.2.4 Example

Figure 4C:
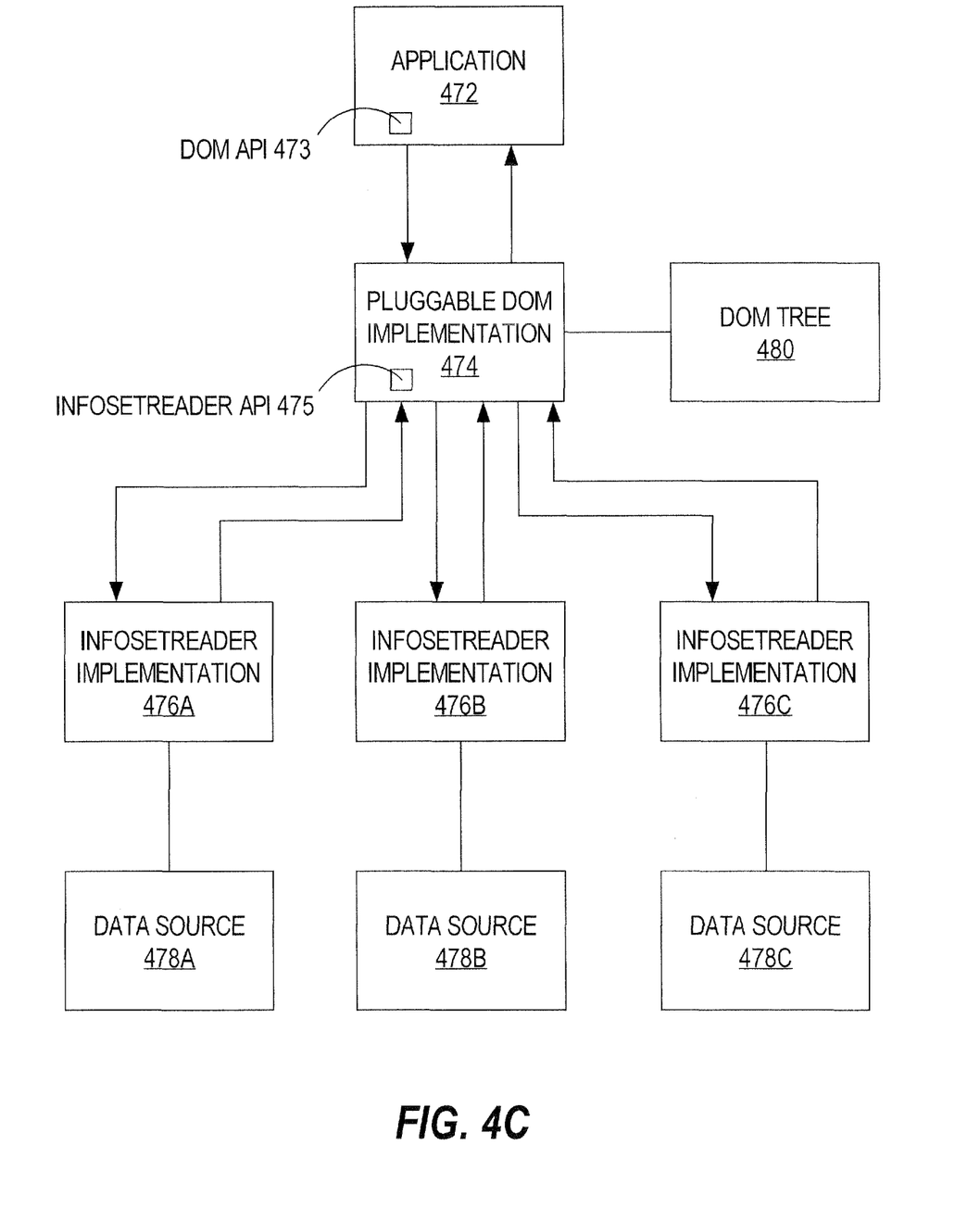

FIG. 4C is a block diagram that illustrates steps that are performed in response to a standard DOM API 473 call by an executing application 472, according to an embodiment of the invention. A pluggable DOM implementation 474 manages a DOM tree 480. In the illustrated example, three data sources are plugged into pluggable DOM implementation 474—data source 478A, data source 478B, and data source 478C. A different InfosetReader implementation 476 is defined for each data source 478. For example, InfosetReader implementation 476A is defined for data source 478A, and so forth.

The DOM API 473 may be "getFirstChild" on the root node, of an XML document, that is materialized in memory. The root node is a node in DOM tree 480. In response to the "getFirstChild" API call, if pluggable DOM implementation 474 is also scalable, then pluggable DOM implementation 474 determines whether a node that corresponds to first child of the root node is already stored in memory.

If not, then pluggable DOM implementation 474 calls or invokes one or more InfosetReader APIs 475 that correspond to DOM API 473. In an embodiment, a pluggable DOM implementation first determines whether a node (that is not stored in memory) is stored in a cache of already parsed XML entities. If not, then pluggable DOM implementation 474 determines which data source 476 the XML document is stored in. If the XML document is stored in data source 476B, then InfosetReader implementation 478B executes the implementation of the one or more InfosetReader APIs 475. InfosetReader implementation 478B retrieves the parsed XML entity (that corresponds to the first child of the root node) from data source 476B and returns the parsed XML entity to pluggable DOM implementation 474.

Pluggable DOM implementation 474 generates a node for the parsed XML entity and updates DOM tree 480 to include the node. If application 472 calls the DOM API "getValue" on the returned node, then pluggable DOM implementation 474 obtains the value of the node and provides the value to application 472.

As alluded to above, a benefit of a pluggable DOM is that unnecessary conversion and parsing for already parsed XML data may be avoided. Another benefit is that various XML data sources are allowed to "flow" from one application to another (i.e., the XML data's form is not changed) using the same (i.e., InfosetReader) APIs. Another benefit of the pluggable DOM is that it ensures the scalability of DOM operations. DOM nodes are created in memory only when accessed and may be freed from memory when not in use.

4.0 Hardware Overview

Figure 5:
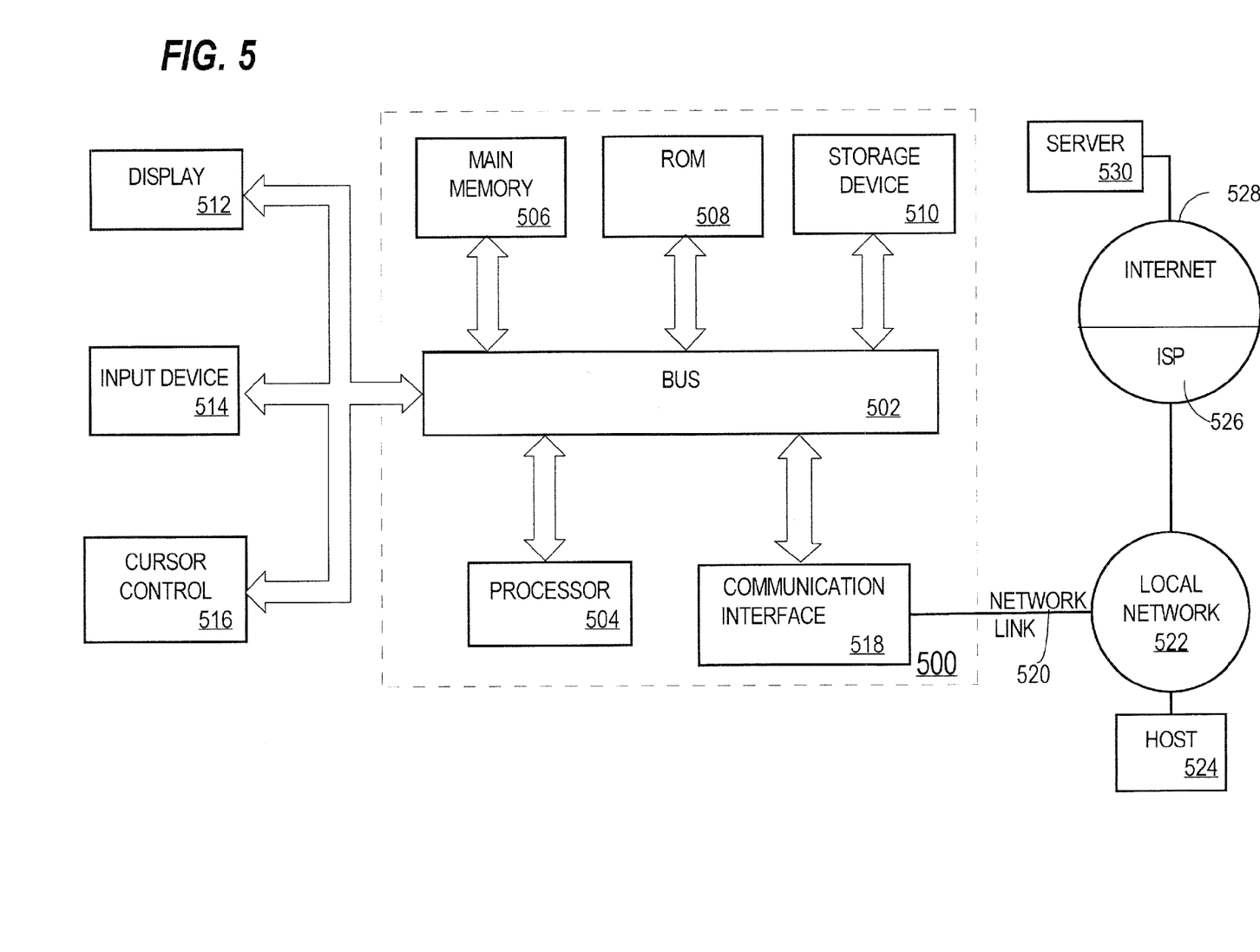
FIG. 5 is a block diagram of a computer system upon which embodiments of the invention may be implemented.

FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to an embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a first instruction to generate a copy of a subtree of an XML tree that is stored in memory, wherein the subtree comprises a plurality of nodes;
   in response to receiving the first instruction:
      creating a new node that represents a copy of the subtree; and
      causing the new node to reference a root node of the subtree;
   wherein at least a subset of the plurality of nodes are not copied as a result of the first instruction;
   after creating the new node,
   receiving a second instruction to access one or more first nodes of the copy;
   in response to receiving the second instruction, using the new node to access one or more first nodes of the subtree that correspond to the one or more first nodes of the copy;
   after receiving the second instruction, receiving, from an application, a third instruction to modify one or more second nodes of the copy, wherein the one or more second nodes of the copy have not yet been generated; and
   in response to receiving the third instruction:
      generating a copy of at least each node of the subtree that corresponds to the one or more second nodes of the copy, and
      modifying the one or more second nodes of the copy without modifying any node in the subtree that corresponds to a node of the one or more second nodes of the copy.

2. The method of claim 1, wherein:
   the XML tree represents XML data that is stored persistently in a database;
   the XML data is stored in a binary format.

3. The method of claim 1, wherein none of the plurality of nodes is copied as a result of the first instruction.

4. The method of claim 1, further comprising:
   after receiving the first instruction, receiving a fourth instruction to delete the subtree;
   in response to receiving the fourth instruction, deleting the subtree only after the new node no longer references the root node of the subtree.

5. The method of claim 1, further comprising:
   receiving a fourth instruction to generate a second copy of a second subtree of the XML tree, wherein the second subtree comprises a second plurality of nodes that are different than the plurality of nodes;
in response to receiving the fourth instruction:
creating a second new node that represents the second copy; and
causing the second new node to reference the root node of the second subtree;
wherein at least a subset of the second plurality of nodes are not copied as a result of the third instruction;
after creating the second new node,
receiving a fifth instruction to modify one or more nodes in the second subtree; and
in response to receiving the fifth instruction:
generating a copy of each node of the second subtree before modifying the one or more nodes in the second subtree, and
modifying the one or more nodes in the second subtree without modifying any copy of any node of the second subtree.

6. One or more storage media storing instructions which, when
executed by one or more processors, causes:
receiving a first instruction to generate a copy of a subtree of an XML tree that is stored in memory, wherein the subtree comprises a plurality of nodes;
in response to receiving the first instruction:
creating a new node that represents a copy of the subtree; and
causing the new node to reference a root node of the subtree;
wherein at least a subset of the plurality of nodes are not copied as a result of the first instruction;
after creating the new node,
receiving a second instruction to access one or more first nodes of the copy;
in response to receiving the second instruction, using the new node to access one or more first nodes of the subtree that correspond to the one or more first nodes of the copy;
after receiving the second instruction, receiving, from an application, a third instruction to modify one or more second nodes of the copy, wherein the one or more second nodes of the copy have not yet been generated; and
in response to receiving the third instruction:
generating a copy of at least each node of the subtree that corresponds to the one or more second nodes of the copy, and
modifying the one or more second nodes of the copy without modifying any node in the subtree that corresponds to a node of the one or more second nodes of the copy.

7. The one or more storage media of claim 6, wherein:
the XML tree represents XML data that is stored persistently in a database;
the XML data is stored in a binary format.

8. The one or more storage media of claim 6, wherein none of the plurality of nodes is copied as a result of the first instruction.

9. The one or more storage media of claim 6, wherein the instructions,
when executed by the one or more processors, further cause:
after receiving the first instruction, receiving a fourth instruction to delete the subtree;
in response to receiving the fourth instruction, deleting the subtree only after the new node no longer references the root node of the subtree.

10. The one or more storage media of claim 6, wherein the instructions,
when executed by the one or more processors, further cause:
receiving a fourth instruction to generate a second copy of a second subtree of the XML tree, wherein the second subtree comprises a second plurality of nodes that are different than the plurality of nodes;
in response to receiving the fourth instruction:
creating a second new node that represents the second copy; and
causing the second new node to reference the root node of the second subtree;
wherein at least a subset of the second plurality of nodes are not copied as a result of the third instruction;
after creating the second new node, receiving a fifth instruction to modify one or more nodes in the second subtree; and
in response to receiving the fifth instruction:
generating a copy of each node of the second subtree before modifying the one or more nodes in the second subtree, and
modifying the one or more nodes in the second subtree without modifying any copy of any node of the second subtree.

11. A method comprising:
receiving a first instruction to generate a copy of a subtree of an XML tree that is stored in memory, wherein the XML tree represents XML data that is stored persistently in a database, wherein the subtree comprises a plurality of nodes;
in response to receiving the first instruction:
creating a new node that represents a copy of the subtree; and
causing the new node to reference a root node of the subtree;
wherein at least a subset of the plurality of nodes are not copied as a result of the first instruction;
after creating the new node, receiving a second instruction to access one or more first nodes of the copy;
in response to receiving the second instruction, using the new node to access one or more first nodes of the subtree that correspond to the one or more first nodes of the copy;
receiving a third instruction to save the copy of the subtree; and
in response to receiving the third instruction, saving a reference to the database without copying all the plurality of nodes, wherein the reference references, in the database, the portion of the XML data that is represented by the subtree.

12. The method of claim 11, further comprising:
receiving an update operation to modify one or more nodes of the XML tree that are stored in the memory;
in response to receiving the update operation, modifying the one or more nodes of the XML tree; and
storing a second version of the XML tree by:
storing persistently, in the database, data that corresponds to the modified one or more nodes; and
storing persistently, in the database, one or more references to portions of the XML data that correspond to nodes of the XML tree that were not changed as a result of the update operation.

13. The method of claim 11, wherein the XML data is stored in a binary format.

14. The method of claim 11, wherein none of the plurality of nodes is copied as a result of the first instruction.

15. The method of claim 12, further comprising:
for each ancestor node of the one or more nodes, storing copies of particular portions of the XML data that correspond to said each ancestor node, wherein none of the one or more references references the particular portions of the XML data.

16. The method of claim 12, further comprising:
receiving a fourth instruction to read a portion of the second version, wherein the portion includes target data, wherein the target data is a portion of the XML data that was not modified as a result of the update operation; and
in response to receiving the fourth instruction, using the one or more references to access the target data.

17. One or more storage media storing instructions which, when executed by one or more processors, cause:
receiving a first instruction to generate a copy of a subtree of an XML tree that is stored in memory, wherein the XML tree represents XML data that is stored persistently in a database, wherein the subtree comprises a plurality of nodes;
in response to receiving the first instruction:
creating a new node that represents a copy of the subtree; and
causing the new node to reference a root node of the subtree;
wherein at least a subset of the plurality of nodes are not copied as a result of the first instruction;
after creating the new node, receiving a second instruction to access one or more first nodes of the copy;
in response to receiving the second instruction, using the new node to access one or more first nodes of the subtree that correspond to the one or more first nodes of the copy;
receiving a third instruction to save the copy of the subtree; and
in response to receiving the third instruction, saving a reference to the database without copying all the plurality of nodes, wherein the reference references, in the database, the portion of the XML data that is represented by the subtree.

18. The one or more storage media of claim 17, wherein the XML data is stored in a binary format.

19. The one or more storage media of claim 17, wherein none of the plurality of nodes is copied as a result of the first instruction.

20. The one or more storage media of claim 17, wherein the instructions,
when executed by the one or more processors, further cause:
receiving an update operation to modify one or more nodes of the XML tree that are stored in the memory;
in response to receiving the update operation, modifying the one or more nodes of the XML tree; and
storing a second version of the XML tree by:
storing persistently, in the database, data that corresponds to the modified one or more nodes; and
storing persistently, in the database, one or more references to portions of the XML data that correspond to nodes of the XML tree that were not changed as a result of the update operation.

21. The one or more storage media of claim 20, wherein the instructions, when executed by the one or more processors, further cause:
for each ancestor node of the one or more nodes, storing copies of particular portions of the XML data that correspond to said each ancestor node, wherein none of the one or more references references the particular portions of the XML data.

22. The one or more storage media of claim 20, wherein the instructions, when executed by the one or more processors, further cause:
receiving a fourth instruction to read a portion of the second version, wherein the portion includes target data, wherein the target data is a portion of the XML data that was not modified as a result of the update operation; and
in response to receiving the fourth instruction, using the one or more references to access the target data.

* * * * *